United States Patent [19]
Bronstert et al.

[11] Patent Number: 5,115,022
[45] Date of Patent: May 19, 1992

[54] THERMOPLASTICS OF POLYALKYLENE TEREPHTHALATES IMPACT MODIFIED WITH FUNCTIONALIZED POLYMERS AND USE THEREOF FOR PRODUCING MOLDINGS

[75] Inventors: Klaus Bronstert, Carlsberg; Hans-Dieter Schwaben, Freisbach; Adolf Echte, Ludwigshafen, all of Fed. Rep. of Germany

[73] Assignee: BASF Aktiengesellschaft, Ludwigshafen, Fed. Rep. of Germany

[21] Appl. No.: 481,689

[22] Filed: Feb. 20, 1990

Related U.S. Application Data

[63] Continuation of Ser. No. 153,931, Feb. 9, 1988, abandoned.

[30] Foreign Application Priority Data

Feb. 25, 1987 [DE] Fed. Rep. of Germany ....... 3706017

[51] Int. Cl.$^5$ ............................................. C08L 67/02
[52] U.S. Cl. ..................................... 525/92; 525/175; 525/177
[58] Field of Search .......................... 525/177, 175, 92

[56] References Cited

U.S. PATENT DOCUMENTS

| | | | |
|---|---|---|---|
| 3,564,077 | 2/1971 | Brinkmann et al. | 525/177 |
| 3,969,306 | 7/1976 | Borman et al. | 525/177 |
| 4,373,067 | 2/1983 | Dieck et al. | 525/177 |
| 4,594,388 | 6/1986 | Arai | 525/177 |
| 4,753,991 | 6/1988 | Bronstert | 525/98 |

OTHER PUBLICATIONS

Flory, "Principles of Polymer Chemistry", Cornell Univ. Press, 1953, pp. 245–246.

*Primary Examiner*—Ana L. Carrillo
*Attorney, Agent, or Firm*—Keil & Weinkauf

[57] ABSTRACT

Impact modified thermoplastic blends of components A, B and optionally C, consisting of:
- A) from 99 to 60 percent by weight of a polymeric rigid matrix consisting of polybutylene terephthalate or polyethylene terephthalate
- B) from 1 to 40 percent by weight of a polymeric flexibilizing component comprising
  - b1) 100–60 percent by weight of a monomer from the group of the 1,3-dienes which is present as copolymerized units and
  - b2) 0–40 percent by weight of an aromatic vinyl compound present as copolymerized units and
- C) optionally customary additives in customary amounts, the polymers of flexibilizing component B having amino end groups, are used for producing moldings.

2 Claims, No Drawings

THERMOPLASTICS OF POLYALKYLENE TEREPHTHALATES IMPACT MODIFIED WITH FUNCTIONALIZED POLYMERS AND USE THEREOF FOR PRODUCING MOLDINGS

This application is a continuation of application Ser. No. 153,931, filed on Feb. 20, 1988, now abandoned.

The present invention relates to impact modified thermoplastic blends. Blends of this type are used for producing moldings.

The impact strength of thermo plastic polyesters can be improved by admixing elastomeric polymers obtained by emulsion polymerization. This is described for example in the publications DE-A-1,694,173, DE-C-2,348,377, EP-8-22,216 and EP-A-187,313, so that reference to these publications may suffice.

The emulsion polymers required for this purpose are technically complicated, costly and difficult to prepare reproducibly; in particular the lack of uniformity in the graft envelope between different batches can lead to variations in product quality.

It is an object of the present invention to find a flexibilizing component which is simple, inexpensive and readily reproducible to prepare and with which the thermoplastic component can be impact modified.

We have found that this object is achieved by providing a thermoplastic blend of components A, B and optionally C, consisting of:

A) from 99 to 60 percent by weight, based on the sum of A and B, of a polymeric rigid matrix consisting of
  a1) polybutylene terephthalate or
  a2) polyethylene terephthalate
B) from 1 to 40 percent by weight, based on the sum of A and B, of a polymeric flexibilizing component comprising
  b1) 100-60 percent by weight of a monomer from the group of the 1,3-dienes which is present as copolymerized units and
  b2) 0-40 percent by weight of an aromatic vinyl compound present as copolymerized units, the weight percentages in each case being based on the sum of b1 and b2, and also
c) from 0 to 30 percent by weight, based on 100 parts by weight of the sum of components A and B, of customary additives, wherein the polymers of flexibilizing component B have amino end groups.

In what follows, the buildup of the thermoplastic blend according to the invention is described together with the process used for its preparation and the starting and auxiliary materials required.

The thermoplastic blend contains components A, B and optionally C. Preferably, the thermoplastic blend consists of components A and B. The blend may also contain customary additives in customary amounts as component C.

The polymeric molding composition comprises, in each case based on the sum of the weights of A and B:
A) 99-60, preferably 95-65, % by weight of a polymeric rigid matrix The polymeric rigid matrix consists of a polybutylene terephthalate or a polyethylene terephthalate.

B) 1-40, preferably 5-35, % by weight of a polymeric flexibilizing component

The polymeric flexibilizing component can contain, as compolymerized units, the monomers, based on B,
  b1) 100-60, preferably 100-70, % by weight,
  b2) 0-40, preferably 0-30, % by weight.

Based on 100 parts by weight of the sum of components A and B, the polymeric molding composition can contain from 0 to 30, preferably 0-25, parts by weight of component C, i.e. customary additives.

In detail the molding composition consists of Component A

Component A is a polybutylene terephthalate which can be prepared by a polycondensation as described for example in FR-A-2,177,846 or FR-A-2,186,510. Component A can also be a polyethylene terephthalate as described for example in U.S. Pat. Nos. 2,465,319 and 3,047,539. The viscosity number of a 0.5% strength by weight solution in 1:1 dichlorobenzene/phenol of the above plyalkylene terephthalates at 25° C. should preferably be within the range from 100 to 180 ml/g, in particular from 100 to 150 ml/g. Component B It contains
  b1) as starting monomer one or more 1,3-dienes. Preference is given to the exclusive use of butadiene.

Further possible starting comonomers present as
  b2) can be aromatic monovinyl compounds, preferably styrene.

The thermoplastic component B shall be terminated with amino groups.

The polymeric component B is prepared for example by anionic polymerization of butadiene and termination with 1,5-diazabicyclo[3.1.0]hexane. The process is described in detail in EP-A-211,395, so that no description is necessary here.

The molecular weight of component B is within the range from 30,000 to 400,000 g/mol (weight average), preferably from 50,000 to 300,000 g/mol, in particular from 60,000 to 250,000 g/mol, determined by gel permeation chromatography.

The preferred polymeric starting material for component B is a homopolybutadiene or a block copolymer of butadiene containing up to 40% by weight of styrene. The transition between the blocks can be sharp or smudged. Component C Additives used in the preparation of the molding composition according to the invention can comprise, as is known to those skilled in the art, mineral oils, antistats, flameproofing agents, pigments, stabilizers and other customary additives which improve the performance characteristics, in amounts from 0 to 30, preferably from 0 to 25, % by weight, based on 100 parts by weight of the sum of components A and B.

The blends can be prepared using any desired means which permit homogeneous mixing of components A and B in the melt, for example rolls, kneaders or extruders. In the preparation of the blends, the two components, including if present component C, can be premixed or metered in separately. The preparation temperature is within the range from 150° to 350° C., preferably from 200° to 300° C.

It is also possible, but less preferable, to mix components A and B in the form of solutions and then to remove the solvent.

The Examples and Comparative Tests which follow serve to illustrate the invention in more detail without, however, restricting its scope. In each case, 10% by weight of component B and 90% by weight of component A were used.

In Examples 1 and 2, a two-block copolymer of 9% by weight of styrene and 91% by weight of butadiene having a sharp block transition and a molecular weight (GPC average) of 75,000 g/mol, where the polybutadiene end had been modified with a 1,3-propylenediamine end group as described in EP-A-211,395 Example 3, was used as component B.

In the corresponding Comparative Tests (CT) component B comprised a nonfunctionalized homopolybutadiene having a solution viscosity of 130 ml/g (5% strength by weight in toluene at 25° C.).

The polymers of component A are a commercial polybutylene terephthalate (ULTRADUR B 4500 from BASF) in Example 1 and a commercial polyethylene terephthalate (ULTRADUR A 1550 from BASF) in Example 2.

The molding compositions were prepared on a ZSK 30 twin-screw extruder from Werner und Pfleiderer at from 250° to 300° C. The molding compositions emerging as polymer extrudates were cooled in a waterbath, then granulated and dried, and subsequently the impact strength was determined in terms of hole impact strength as defined in German Standard Specification DIN 53,753.

TABLE

|       | aKL (kj/m$^2$) | aKL (kj/m$^2$) of unmodified thermoplastic |
|-------|----------------|--------------------------------------------|
| Ex. 1 | 20.1           | 12.0                                       |
| CT. 1 | 13.1           |                                            |
| Ex. 2 | 25.5           | 19.5                                       |
| CT. 2 | 20.6           |                                            |

We claim:
1. An impact modified thermoplastic blend consisting essentially of from 99 to 60 percent by weight of a polymeric rigid matrix component A and from 1 to 40 percent by weight of a polymeric flexibilizing component B, said weight percentages being based on the sum of components A and B, wherein the rigid polymer component A is selected from the group consisting of
   a1) polybutylene terephthalate and
   a2) polyethylene terephthalate and the flexibilizing component B is a block copolymer of butadiene and styrene having amino end groups.
2. The impact modified thermoplastic blend of claim 1, wherein component B is a two block copolymer of 9% by weight of styrene and 91% by weight of butadiene.

* * * * *